US012080217B2

(12) United States Patent
Liu

(10) Patent No.: US 12,080,217 B2
(45) Date of Patent: Sep. 3, 2024

(54) DISPLAY DEVICE DRIVING CONTROL CIRCUIT ASSEMBLY AND DISPLAY DEVICE

(71) Applicant: TCL CHINA STAR OPTOELECTRONICS TECHNOLOGY CO., LTD., Guangdong (CN)

(72) Inventor: Jinfeng Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/607,848

(22) PCT Filed: Sep. 15, 2021

(86) PCT No.: PCT/CN2021/118522
§ 371 (c)(1),
(2) Date: Oct. 29, 2021

(87) PCT Pub. No.: WO2023/024191
PCT Pub. Date: Mar. 2, 2023

(65) Prior Publication Data
US 2024/0029619 A1 Jan. 25, 2024

(30) Foreign Application Priority Data
Aug. 24, 2021 (CN) ......................... 202110973613.3

(51) Int. Cl.
*G09G 3/20* (2006.01)

(52) U.S. Cl.
CPC ....... *G09G 3/2092* (2013.01); *G09G 2310/08* (2013.01); *G09G 2330/06* (2013.01)

(58) Field of Classification Search
CPC ............. G09G 3/2092; G09G 2310/08; G09G 2330/06
See application file for complete search history.

(56) References Cited

U.S. PATENT DOCUMENTS

| | | | | |
|---|---|---|---|---|
| 10,950,156 | B1 | 3/2021 | Hsu et al. | |
| 2008/0225036 | A1 * | 9/2008 | Song | G09G 3/3648 345/99 |

(Continued)

FOREIGN PATENT DOCUMENTS

| | | | |
|---|---|---|---|
| CN | 101009076 | A | 8/2007 |
| CN | 101533627 | A | 9/2009 |

(Continued)

OTHER PUBLICATIONS

International Search Report in International application No. PCT/CN2021/118522,mailed on May 23, 2022.

(Continued)

*Primary Examiner* — Dmitriy Bolotin
(74) *Attorney, Agent, or Firm* — PV IP PC; Wei Te Chung

(57) ABSTRACT

The present application provides a display device driving control circuit assembly and a display device. In the present application, a frequency of the first timing control clock of the first timing controller and a frequency of the second timing control clock of the second timing controller are different, as a result, a radiation intensity generated by the first timing controller and the second timing controller during operation is greatly reduced, thereby greatly reducing an intensity of electromagnetic compatibility.

12 Claims, 3 Drawing Sheets

(56) References Cited

U.S. PATENT DOCUMENTS

| | | | | |
|---|---|---|---|---|
| 2012/0120048 | A1* | 5/2012 | Nishimoto | G09G 3/20 345/212 |
| 2015/0325164 | A1* | 11/2015 | Kim | G09G 3/3648 345/694 |
| 2016/0125845 | A1* | 5/2016 | Oh | G09G 3/3666 345/214 |
| 2019/0304397 | A1* | 10/2019 | Im | G09G 5/008 |
| 2021/0049965 | A1* | 2/2021 | Jeon | G09G 3/3233 |

FOREIGN PATENT DOCUMENTS

| | | | |
|---|---|---|---|
| CN | 103903576 | A | 7/2014 |
| CN | 103903577 | A | 7/2014 |
| CN | 109345996 | A | 2/2019 |
| CN | 112053662 | A | 12/2020 |
| JP | 2009115936 | A | 5/2009 |

OTHER PUBLICATIONS

Written Opinion of the International Search Authority in International application No. PCT/CN2021/118522,mailed on May 23, 2022.

Chinese Office Action issued in corresponding Chinese Patent Application No. 202110973613.3 dated May 8, 2023, pp. 1-8.

* cited by examiner

DISPLAY DEVICE DRIVING CONTROL CIRCUIT ASSEMBLY AND DISPLAY DEVICE

RELATED APPLICATIONS

This application is a Notional Phase of PCT Patent Application No. PCT/CN2021/118522 having international filing date of Sep. 15, 2021, which claims the benefit of priority of Chinese Patent Application No. 202110973613.3 filed on Aug. 24, 2021. The contents of the above applications are all incorporated by reference as if fully set forth herein in their entirety.

FIELD OF INVENTION

The present application relates to a field of display technology, in particular to a display device driving control circuit assembly and a display device.

BACKGROUND OF INVENTION

With a development of high resolution and high refresh rate of liquid crystal display (LCD), a higher rate transmission protocol is required. A high rate transmission signal needs a high-speed clock signal, which will cause serious electromagnetic interference (EMI) issues. The prior art display device includes a display panel, twelve driving chips, such as chip-on-film (COF) driving chips, connected to the display panel, and two timing controllers (TCON) respectively connected to the twelve driving the chips. When the display panel is operating, the two timing controllers transmit a signal to each of the driving chips, and each of the driving chip decodes the signal to obtain clock signals. However, the high-speed clock signals of the two timing controllers and the clock signals of the twelve driving chips have the same clock, resulting in a superimposition of energy and a problem of excessively high EMI at some clock frequencies.

Therefore, there is an urgent need to solve the EMC problems of the above-mentioned display panel caused by the high-speed timing controller and the driving chip of the same frequency.

SUMMARY OF INVENTION

The embodiments of the present application provide a display device driving control circuit assembly and a display panel to solve the issue that the two timing controllers of the prior art display device have high-speed clock signals with the same clock frequency, and the clock signals of a plurality of driving chips also have the same clock frequency, resulting in a problem of superimposition of energy and excessively high electromagnetic interference (EMI) at some clock frequencies.

The embodiment of the present application provides a display device driving control circuit assembly, wherein the display device driving control circuit assembly includes:

a timing control module including a first timing controller and a second timing controller, wherein the first timing controller is configured to transmit a first timing control signal according to a first timing control clock, and the second timing controller is configured to transmit a second timing control signal according to a second timing control clock, and wherein a frequency of the second timing control clock is different from a frequency of the first timing control clock;

a first driving control module including a plurality of first driving control chips electrically connected to the first timing controller, wherein each of the first driving control chips is configured to receive the first timing control signal, to generate a first driving signal according to the first timing control signal, and to transmit the first driving signal to a display panel, and wherein the first driving signal is embedded with a first driving control clock; and a second driving control module including a plurality of second driving control chips electrically connected to the second timing controller, wherein each of the second driving control chips is configured to receive the second timing control signal, to generate a second driving signal according to the second timing control signal, and to transmit the second driving signal to the display panel, wherein the second driving signal is embedded with a second driving control clock, and wherein a frequency of the second driving control clock is different from a frequency of the first driving control clock.

In some embodiments of the present application, the first timing controller includes:

a spread-spectrum crystal oscillator frequency multiplier unit configured to provide the first timing control clock; and a point-to-point transmission unit configured to embed the first timing control clock in the first timing control signal and transmit the first timing control signal;

wherein constituent units of the second timing controller are the same as constituent units of the first timing controller, and a frequency range of the first timing control clock does not overlap with a frequency range of the second timing control clock.

In some embodiments of the present application, a spread-spectrum crystal oscillator frequency multiplier unit of the first timing controller is configured to provide the first timing control clock according to a first center frequency f1 and a first spreading ratio value r1, the frequency of the first timing control clock ranges from $f1(1-r1)$ to $f1(1+r1)$, a spread-spectrum crystal oscillator frequency multiplication unit of the second timing controller is configured to provide the second timing control clock according to a second center frequency f2 and a second spread-spectrum ratio value r2, and the frequency of the second timing control clock ranges from $f2(1-r2)$ to $f2(1+r2)$.

In some embodiments of the present application, the first timing controller is a master timing controller, and the second timing controller is a slave timing controller, and wherein a second center frequency f2 of the second timing control clock of the second timing controller is set according to an offset of the first center frequency f1 of the first timing control clock of the first timing controller, and meets $f1>f2$ and $f1(1-r1)>f2(1+r2)$.

In some embodiments of the present application, a frequency difference $(f1-f2)/f1$ of the second center frequency f2 of the second timing control clock and the first center frequency f1 of the first timing control clock ranges from 2% to 10%.

In another aspect, the present application provides a display device, including a display panel including a plurality of pixel units; and a display device driving control circuit assembly connected to the display panel, wherein the display device driving control circuit assembly includes:

a timing control module including a first timing controller and a second timing controller, wherein the first timing controller is configured to transmit a first timing control signal according to a first timing control clock, and the second timing controller is configured to transmit a second timing control signal according to a second timing control clock, and wherein a frequency of the second timing control clock is different from a frequency of the first timing control clock;

a first driving control module including a plurality of first driving control chips electrically connected to the first timing controller, wherein each of the first driving control chips is configured to receive the first timing control signal, to generate a first driving signal according to the first timing control signal, and to transmit the first driving signal to a display panel, and wherein the first driving signal is embedded with a first driving control clock; and a second driving control module including a plurality of second driving control chips electrically connected to the second timing controller, wherein each of the second driving control chips is configured to receive the second timing control signal, to generate a second driving signal according to the second timing control signal, and to transmit the second driving signal to the display panel, wherein the second driving signal is embedded with a second driving control clock, and wherein a frequency of the second driving control clock is different from a frequency of the first driving control clock;

wherein the first timing controller and the first driving control module are configured to drive a part of the plurality of pixel units, and the second timing controller and the second driving control module are configured to drive another part of the plurality of pixel units.

In some embodiments of the present application, a spread-spectrum crystal oscillator frequency multiplier unit is configured to provide the first timing control clock; and a point-to-point transmission unit is configured to embed the first timing control clock in the first timing control signal and transmit the first timing control signal;

wherein constituent units of the second timing controller are the same as constituent units of the first timing controller, and a frequency range of the first timing control clock does not overlap with a frequency range of the second timing control clock.

In some embodiments of the present application, a spread-spectrum crystal oscillator frequency multiplier unit of the first timing controller is configured to provide the first timing control clock according to a first center frequency f1 and a first spreading ratio value r1, the frequency of the first timing control clock ranges from f1(1−r1) to f1(1+r1), a spread-spectrum crystal oscillator frequency multiplication unit of the second timing controller is configured to provide the second timing control clock according to a second center frequency f2 and a second spread-spectrum ratio value r2, and the frequency of the second timing control clock ranges from f2(1−r2) to f2(1+r2).

In some embodiments of the present application, the first timing controller is a master timing controller, and the second timing controller is a slave timing controller, and wherein a second center frequency f2 of the second timing control clock of the second timing controller is set according to an offset of the first center frequency f1 of the first timing control clock of the first timing controller, and meets f1>f2, and f1(1−r1)>f2(1+r2).

In some embodiments of the present application, a frequency difference of the second timing control clock and the first timing control clock ranges from 2% to 10%.

The present application has at least the following advantages:

The display device driving control circuit assembly and the display device provided in the present application by making a frequency of a first timing control clock of a first timing controller and a frequency of a second timing control clock of a second timing controller different, greatly reducing a radiation intensity compared to the prior art display device, and thus greatly reducing an electromagnetic interference intensity, thereby solving the issue of excessively high electromagnetic interference caused by the plurality driving chips having the same clock frequency of the prior art display device.

DESCRIPTION OF FIGURES

In order to more clearly describe the technical solutions in the embodiments of the present application, the following will briefly introduce the figures needed in the description of the embodiments. Obviously, the figures in the following description are only some embodiments of the present application. For those skilled in the art, without inventive steps, other figures can be obtained based on these figures.

DETAILED DESCRIPTION OF EMBODIMENTS

The technical solutions in the embodiments of the present application will be clearly and completely described below in conjunction with the figures in the embodiments of the present application. Obviously, the described embodiments are only a part of the embodiments of the present application, rather than all the embodiments. Based on the embodiments in the present application, all other embodiments obtained by those skilled in the art without inventive steps are within the protection scope of the present application.

Figure 1:
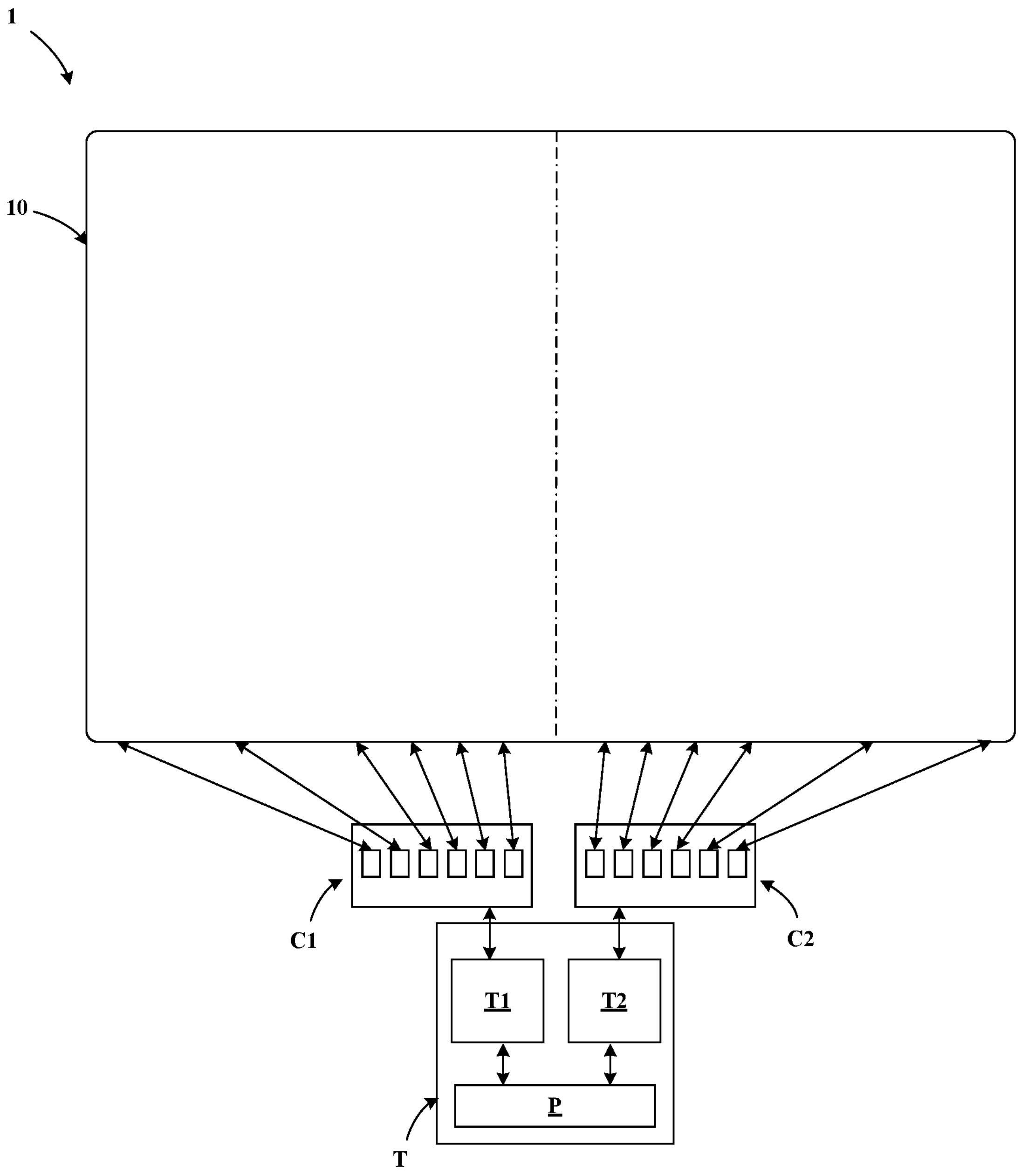
FIG. 1 is a schematic plan view of a display device provided by one embodiment of the present application, wherein the display device includes a display panel and a display device driving control circuit assembly.

Please refer to FIG. 1, one embodiment of the present application provides a display device 1 driving control circuit assembly, including a timing control module T, a first driving control module C1, and a second driving control module C2.

Figure 2:
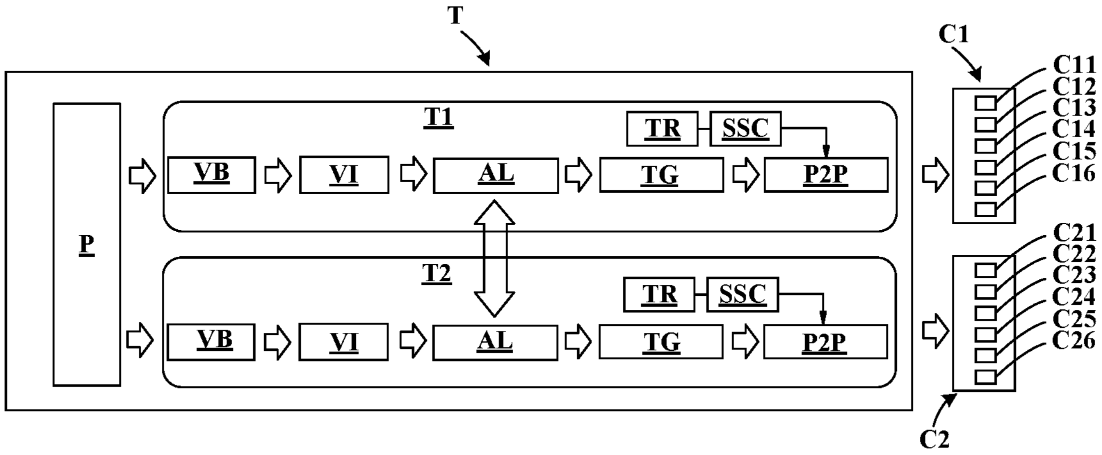
FIG. 2 is a schematic structural diagram of a timing control module of the display device driving control circuit assembly according to one embodiment of the present application.

Please refer to FIG. 2, the timing control module T includes a first timing controller T1 and a second timing controller T2, wherein the first timing controller T1 is configured to transmit a first timing control signal according to a first timing control clock, and the second timing controller T2 is configured to transmit a second timing control signal according to a second timing control clock, and a frequency of the second timing control clock is different from a frequency of the first timing control clock.

In detail, the first timing controller includes a spread-spectrum crystal oscillator frequency multiplier unit SSC configured to provide the first timing control clock, and a point-to-point transmission unit P2P configured to embed the first timing control clock in the first timing control signal and transmit the first timing control signal.

Constituent units of the second timing controller T2 are the same as the constituent units of the first timing controller T1, and a frequency range of the first timing control clock does not overlap with a frequency range of the second timing control clock.

The spread-spectrum crystal oscillator frequency multiplier unit SSC of the first timing controller T1 is configured to provide the first timing control clock according to a first center frequency f1 and a first spreading ratio value r1. The frequency of the first timing control clock ranges from f1(1−r1) to f1(1+r1). The spread-spectrum crystal oscillator frequency multiplication unit SSC of the second timing controller T2 is configured to provide the second center frequency f2 and a second spread-spectrum ratio value r2. The frequency of the second timing control clock ranges from f2(1−r2) to f2(1+r2).

For example, the first center frequency f1 of the first timing control clock is 640 MHz, and the second center frequency f2 of the second timing control clock is 610 MHz. The frequencies of the first timing control clock and the second timing control clock are respectively obtained by modifying a clock register TR in the timing control module T respectively.

The first timing controller T1 is a master timing controller, and the second timing controller T2 is a slave timing controller. A second center frequency f2 of the second timing control clock of the second timing controller is set according to an offset of the first center frequency f1 of the first timing control clock of the first timing controller and meets f1>f2 and f1(1−r1)>f2(1+r2).

For example, the first spreading ratio value r1 is 1%, the second spreading ratio value r2 is 1%, the first center frequency f1 of the first timing control clock is 640 MHz, and the second center frequency f2 of the second timing control clock is 610 MHz. It concludes 640 MHz>610 MHz which conforms with the above equation, and concludes f1(1−r1)=640(1−0.01)=633.6, f2(1+r2)=610(1+0.01)=616.1, and 633.6>616.1, which also conforms with f1(1−r1)>f2(1+r2).

The above design makes the frequency range of the first timing control clock after spreading and the frequency range of the second timing control clock after spreading not overlapped so as not to cause the signal strengths overlapped which cause the issue of excessive electromagnetic interference.

A frequency difference (f1−f2)/f1 of the second center frequency f2 of the second timing control clock and the first center frequency f1 of the first timing control clock ranges from 2% to 10%.

For example, the first center frequency f1 of the first timing control clock is 640 MHz, and the second center frequency f2 of the second timing control clock is 610 MHz. The frequency difference (f1−f2)/f1 is (640−610)/640=4.68%, falling between 2% and 10%.

If the frequency difference is too small, it will cause the frequency ranges overlapped and cause an issue of excessive electromagnetic interference. If the frequency difference is too large, images of the display screen will be disunited. Therefore, the frequency difference preferably ranges from 2% to 10%.

Figure 3:
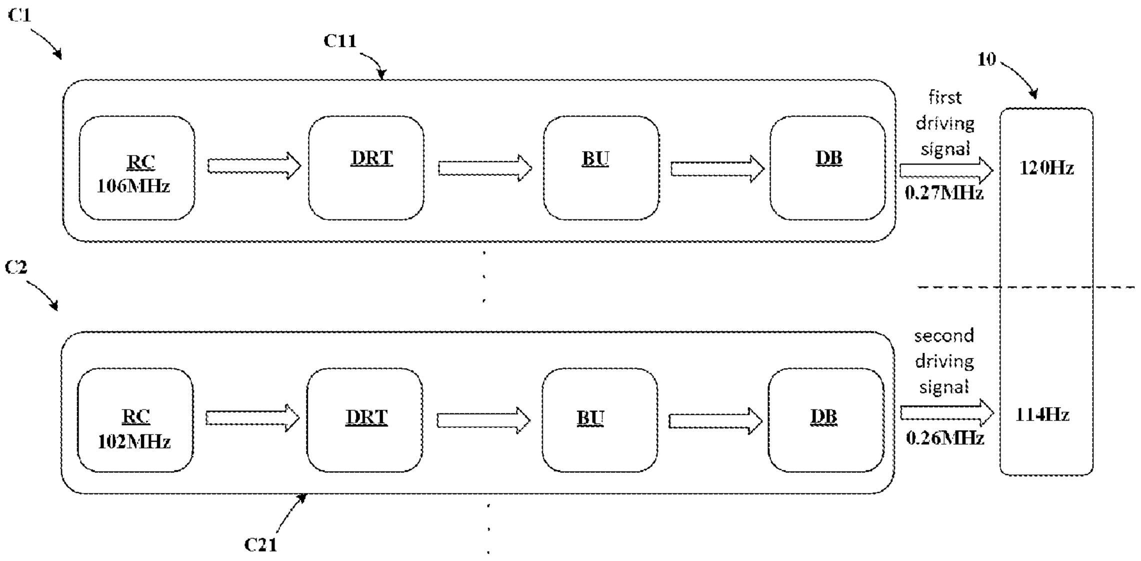
FIG. 3 is a schematic structural diagram of a first driving control module and a second driving control module of the display device driving control circuit assembly according to one embodiment of the present application.

Referring to FIG. 3, the first driving control module C1 includes a plurality of first driving control chips C11 to C16 electrically connected to the first timing controller T1. Each of the first driving control chips C11 to C16 is configured to separately receive different first timing control signal, to generate a first driving signal according to the first timing control signal, and to transmit the first driving signal to the display panel 10. The first driving signal is embedded with a first driving control clock. In detail, the first driving control chips C11 to C16 may be chip-on-film (COF) driving chips.

The second driving control module C2 includes a plurality of second driving control chips C21 to C26 electrically connected to the second timing controller T2. Each of second driving control chips C21 to C26 is configured to receive the second timing control signal, and generate a second driving signal according to the second timing control signal to further transmit the second driving signal to the display panel 10. The first driving signal is embedded with a first driving signal control clock, and the frequency of the second driving control clock is different from the frequency of the first driving control clock. For example, the first driving control clock is shown in FIG. 3 with a frequency of 0.27 MHz (take a panel with a split-screen frame rate of 120 Hz and a resolution of 4740*2250 as an example. In one frame, there are 2250 scan lines on each data line to complete the scan, so the signal frequency on each data line needs to be at least 2250*120=0.27 MHz. Since each of driving control chips provides data in the form of parallel signals, the operating frequency in the driving control chip does not need increase and maintain at 0.27 MHz). The second driving control clock is 0.26 MHz marked in FIG. 3 (take a panel with a split-screen frame frequency of 114 Hz and a resolution of 4740*2250 as an example). In detail, the second driving control chips C21 to C26 may be chip-on-film (COF) driving chips.

In some embodiments of the present application, the timing control module T includes a processor unit P that is electrically connected to the first timing controller T1 and the second timing controller T2, and is configured to transmit differential signals to the first timing controller T1 and the second timing controller T2. Each of the first timing controllers T1 and the second timing controllers T2 includes: a spread-spectrum crystal oscillator frequency multiplier unit SSC, a differential signal receiving unit VB, an algorithm unit AL, a time sequence generating unit TG, and a point-to-point transmission unit P2P.

The spread-spectrum crystal oscillator frequency multiplier unit SSC is configured to provide the first timing control clock.

The differential signal receiving unit VB is configured to receive a differential signal from the processor unit P.

A video capture unit VI is connected to the differential signal receiving unit VB, and is configured to acquire video data in the differential signal.

The algorithm unit AL is connected to the video capture unit VI, and is configured to process the video data.

The time sequence generating unit TG is connected to the algorithm unit AL, and is configured to generate a control timing, that is, to generate a panel row and column scan timing.

The point-to-point transmission unit P2P is connected to the timing generation unit TG, and is configured to embed the first timing control clock in the first timing control signal, and transmit the first timing control signal and the second timing control signal, wherein the first timing control clock is generated by the crystal oscillator frequency multiplier unit in the first timing controller.

The constituent units of the second timing controller are the same as the constituent units of the first timing controller. The point-to-point transmission unit P2P of the first timing controller T1 provides first timing control signals of different frequencies to different first driving control chips C11 to C16 according to a frequency range after the spreading of the frequency spreading crystal oscillator frequency multiplier unit SSC. The point-to-point transmission unit P2P of the second timing controller T2 provides second timing control signals of different frequencies to different second driving control chips C21 to C26 according to the frequency range after the spreading of the frequency spreading crystal oscillator frequency multiplier unit SSC. For example, taking the first timing controller T1 as an example, the first center frequency f1 of the first timing control clock is 640 MHz, which is provided in parallel to 6 first driving control chips C11 to C16, a bus of each of first driving control chips only needs to work at 640 MHz/6=106.67 MHz. Generally, the point-to-point transmission unit P2P provides three signal lines of red, blue, and green for each of first driving control chips.

In some embodiments of the present application, each of the first driving control chips C11 to C16 includes: a data recovery unit RC, a digital logic register transmission unit DRT, a buffer unit BU, and a data bus unit DB.

The data recovery unit RC is configured to receive and process the first timing control signal sent by the point-to-point transmission unit P2P of the first timing controller T1, and convert the first timing control signal from a serial signal into a parallel signal to obtain an internal data signal. Specifically, take a panel with a split-screen frame rate of 120 Hz and a resolution of 4740*2250 as an example. There are a total of 3*4740 data lines in red, blue and green, which are evenly divided into 12 driving control chips (6 first driving control chips and 6 second driving control chips). Each of driving control chips needs to provide 3*4740/12=1185 channels to correspond to the data line. Taking 256 levels of gray as an example, the data of each color requires 8 bits and 1 reserved bit, for a total of 9 bits. The data processing speed required by a driving control chip is as high as 1185*2250*120*9=2880 Mbps. And a component with a 9-bit data unit has an operating frequency of 2280/9=320 MHz. This will produce severe electromagnetic radiation. The point-to-point transmission unit P2P provides three signal lines of red, blue, and green to each of first driving control chips, so that the operating frequency can be reduced to 320/3=106.67 MHz.

According to the foregoing, taking the first center frequency f1 of 640 MHz as an example, the bus of each of first driving control chips works at 640 MHz/6=106.67 MHz. In order to receive the first timing control signal, the data reply unit RC also needs to work at 106.67 MHz. However, after the data recovery unit RC converts the first timing control signal from the serial signal to the parallel signal to obtain the internal data signal, taking the signal lines of each of the red, blue, and green colors to process the serial signal to the parallel signal separately, the subsequent parallel signal only needs to work at 106.67/(1185/3) MHz=0.27 MHz.

The digital logic register transmission unit DRT is connected to the data recovery unit RC, and is configured to receive and process the internal data signal and generate a first driving control clock.

Specifically, the digital logic register transmission unit DRT includes a shift register, a sampling latch, a holding latch, a digital-to-analog converter, etc. for converting the internal data signal into the first driving signal or the second driving signal.

The buffer unit BU is connected to the digital logic register transmission unit DRT, and is configured to buffer output and input impedance and provide a stable first driving signal.

The data bus unit DB is connected to the buffer unit BU, and is configured to transmit the first driving signal to the display panel 10. Specifically, take a panel with a resolution of 4740*2250 as an example. There are a total of 3*4740 data lines in red, blue and green, which are divided into 12 driving control chips (6 first driving control chips and 6 second driving control chips), and the data bus unit DB of each of driving control chips needs to provide 3*4740/12=1185 data lines.

The constituent units of the second driving control chip are the same as the constituent units of the first driving control chip.

Figure 4:
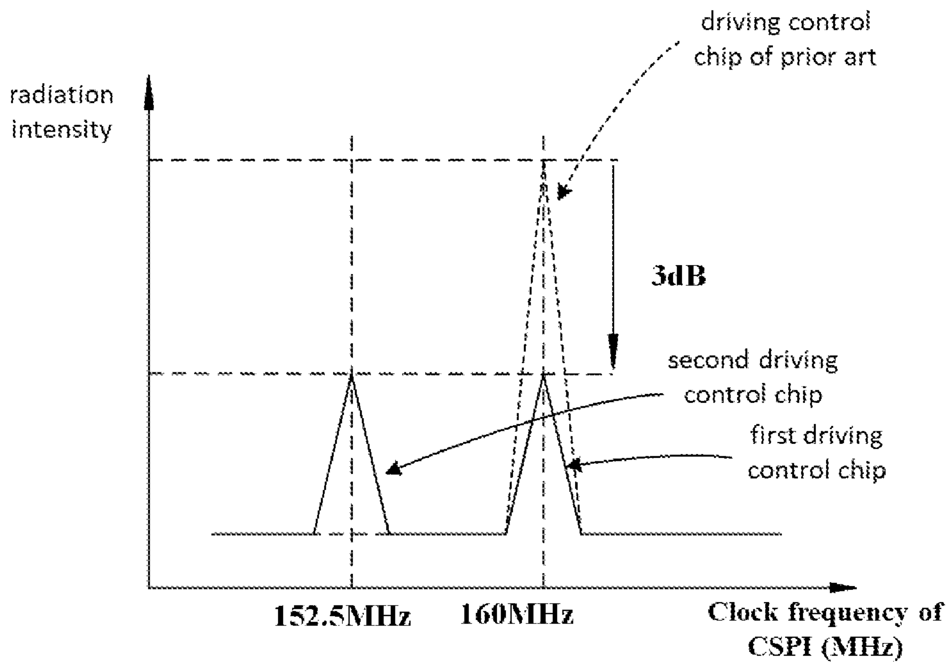
FIG. 4 is a graph of a frequency and radiation intensity of the first driving control chip and the second driving control chip of the display device driving control circuit assembly according to one embodiment of the present application.

Please refer to FIG. 4, FIG. 4 is a graph of a frequency and a radiation intensity of the first driving control chips C11 to C16 and the second driving control chips C21 to C26 of the display device 1 driving control circuit assembly provided by the embodiment of the present application. An operating frequency of the data recovery unit RC of the first driving control chips C11 to C16 is a configurable serial periphery interface (CSPI) clock-data recovery clock, the frequency of which is, for example, 160 Mhz. An operating frequency of the data recovery unit RC of the second driving control chips C21 to C26, that is, the serial peripheral interface clock data recovery clock, has a frequency of, for example, 152.5 Mhz. The first driving control module C1 and the second driving control module C2 operate at different clock frequencies, which causes the radiation intensity to drop by 3 dB compared with the driving control chip of prior art.

Please refer to FIG. 1, on the other hand, the present application provides a display device 1 including: a display panel 10 and the display device driving control circuit assembly in the above-mentioned embodiment.

The display panel 10 includes a plurality of pixel units.

Please refer to FIGS. 2 and 3, the display device driving control circuit assembly is connected to the display panel 10, and the first timing controller T1 and the first driving control module C1 are configured to drive a part of the plurality of pixel units in a split-screen driving manner. For example, the plurality of pixel units in a left half of the display region of the display panel 10, and the second timing controller T2 and the second driving control module C2 are configured to drive another part of the plurality of pixel units. For example, the plurality of pixel units in the right half of the display region of the display panel 10.

In some embodiments of the present application, the timing control module T includes a processor unit P that is electrically connected to the first timing controller T1 and the second timing controller T2, and is configured to transmit differential signals to the first timing controller T1 and the second timing controller T2. The first timing controller T1 includes: a spread-spectrum crystal oscillator frequency multiplier unit SSC, a differential signal receiving unit VB, an algorithm unit AL, a time sequence generating unit TG, and a point-to-point transmission unit P2P.

The spread-spectrum crystal oscillator frequency multiplier unit SSC is configured to provide the first timing control clock.

The differential signal receiving unit VB is configured to receive a differential signal from a processor unit.

A video capture unit VI is connected to the differential signal receiving unit VB, and is configured to convert the differential signal into the video data.

The algorithm unit AL is connected to the video capture unit VI, and is configured to process the video data.

The time sequence generating unit TG is connected to the algorithm unit AL, and is used to generate the first timing control clock.

The point-to-point transmission unit P2P is connected to the timing generation unit TG, and is configured to transmit the first timing control signal or the second timing control signal.

The constituent units of the second timing controller T2 are the same as the constituent units of the first timing controller T1.

The constituent units of the second timing controller are the same as the constituent units of the first timing controller. The point-to-point transmission unit P2P of the first timing controller T1 provides first timing control signals of different frequencies to different first driving control chips C11 to C16 according to a frequency range after the spreading of the frequency spreading crystal oscillator frequency multiplier unit SSC. The point-to-point transmission unit P2P of the second timing controller T2 provides second timing control signals of different frequencies to different second driving control chips C21 to C26 according to the frequency range after the spreading of the frequency spreading crystal oscillator frequency multiplier unit SSC. For example, taking the first timing controller T1 as an example, the first center frequency f1 of the first timing control clock is 640 MHz, which is provided in parallel to 6 first driving control chips C11 to C16, each of the buses that drives the control chip only needs to work at 640 MHz/6=106.67 MHz. Generally, the point-to-point transmission unit P2P provides three signal lines of red, blue, and green for each of first driving control chips.

In some embodiments of the present application, each of the first driving control chips C11 to C16 includes: a data recovery unit RC, a digital logic register transmission unit DRT, a buffer unit BU, and a data bus unit DB.

The data recovery unit RC is configured to receive and process the first timing control signal sent by the point-to-point transmission unit P2P of the first timing controller T1, and convert the first timing control signal from a serial signal into a parallel signal to obtain an internal data signal. Specifically, take a panel with a split-screen frame rate of 120 Hz and a resolution of 4740*2250 as an example. There are a total of 3*4740 data lines in red, blue and green, which are evenly divided into 12 driving control chips (6 first driving control chips and 6 second driving control chips). Each of driving control chips needs to provide 3*4740/12=1185 channels to correspond to the data line. Taking 256 levels of gray as an example, the data of each color requires 8 bits and 1 reserved bit, for a total of 9 bits. The data processing speed required by a driving control chip is as high as 1185*2250*120*9=2880 Mbps. And a component with a 9-bit data unit has an operating frequency of 2280/9=320 MHz. This will produce severe electromagnetic radiation. The point-to-point transmission unit P2P provides three signal lines of red, blue, and green for each of first driving control chips, so that the operating frequency can be reduced to 320/3=106.67 MHz.

According to the foregoing, taking the first center frequency f1 of 640 MHz as an example, the bus of each of first driving control chips works at 640 MHz/6=106.67 MHz. In order to receive the first timing control signal, the data reply unit RC also needs to work at 106.67 MHz. However, after the data recovery unit RC converts the first timing control signal from the serial signal to the parallel signal to obtain the internal data signal, taking the signal lines of each of the red, blue, and green colors to process the serial signal to the parallel signal separately, the subsequent parallel signal only needs to work at 106.67/(1185/3) MHz=0.27 MHz.

The digital logic register transmission unit DRT is connected to the data recovery unit RC, and is configured to receive and process the internal data signal and generate a first driving control clock.

Specifically, the digital logic register transmission unit DRT includes a shift register, a sampling latch, a holding latch, a digital-to-analog converter, etc. for converting the internal data signal into the first driving signal or the second driving signal.

The buffer unit BU is connected to the digital logic register transmission unit DRT, and is configured to buffer output and input impedance and provide a stable first driving signal.

The data bus unit DB is connected to the buffer unit BU, and is configured to transmit the first driving signal to the display panel 10. Specifically, take a panel with a resolution of 4740*2250 as an example. There are a total of 3*4740 data lines in red, blue and green, which are divided into 12 driving control chips (6 first driving control chips and 6 second driving control chips), and the data bus unit DB of each of driving control chips needs to provide 3*4740/12=1185 data lines.

The data bus unit DB is connected to the buffer unit BU, and is configured to convert the internal data signal into the first driving signal or the second driving signal, and is configured to transmit the first driving signal or the second driving signal to the display panel 10.

The constituent units of each of the second driving control chips C21 to C26 are the same as the constituent units of each of the first driving control chips C11 to C16.

The present application has at least the following advantages: The display device 1 driving control circuit assembly and the display device 1 provided in the present application, by making a frequency of a first timing control clock of a first timing controller T1 and a frequency of a second timing control clock of a second timing controller T2 different, a radiation intensity generated during operation is greatly reduced compared to the display device of prior art. In turn, an electromagnetic interference intensity is greatly reduced, thereby solving a problem of excessively high electromagnetic interference caused by a plurality of driving chips of the prior art display device 1 having the same clock frequency.

The driving control circuit components of the display device and the display device provided by the embodiments of the present application have been described in detail above.

In this article, specific examples are used to illustrate the principles and implementation of the present application. The descriptions of the above examples are only used to help understand the methods and core ideas of the present application. At the same time, for those skilled in the art, according to the idea of the present application, there will be changes in a specific implementation and a scope of present application. In summary, a content of the specification should not be construed as a limitation to the present application.

What is claimed is:

1. A display device driving control circuit assembly, comprising:

a timing control module comprising a first timing controller and a second timing controller, wherein the first timing controller is configured to transmit a first timing control signal according to a first timing control clock, and the second timing controller is configured to transmit a second timing control signal according to a second timing control clock, and wherein a frequency of the second timing control clock is different from a frequency of the first timing control clock;

a first driving control module comprising a plurality of first driving control chips electrically connected to the first timing controller, wherein each of the first driving control chips is configured to receive the first timing control signal, to generate a first driving signal according to the first timing control signal, and to transmit the first driving signal to a display panel, and wherein the first driving signal is embedded with a first driving control clock; and a second driving control module comprising a plurality of second driving control chips electrically connected to the second timing controller, wherein each of the second driving control chips is configured to receive the second timing control signal, to generate a second driving signal according to the second timing control signal, and to transmit the second driving signal to the display panel, wherein the second driving signal is embedded with a second driving control clock, and wherein a frequency of the second driving control clock is different from a frequency of the first driving control clock, wherein each of the plurality of first driving control chips comprises: a data recovery device configured to receive and process the first timing control signal, and convert the first timing control signal from a serial signal into a parallel signal to obtain an internal data signal; a digital logic register transmission device electrically connected to the data recovery device and configured to receive and process the internal data signal and generate the first driving control clock; a buffer device electrically connected to the digital logic register transmission device and configured to buffer output and input impedance and provide a stable first driving signal; and a data bus device electrically connected to the buffer device and configured to the stable first driving signal to the display panel, and wherein constituent units of each of the plurality of second driving control chips are the same as constituent units of corresponding one of the plurality of first driving control chips.

2. The display device driving control circuit assembly according to claim 1, wherein the timing control module further comprises a processor device electrically connected to the first timing controller and the second timing controller configured to transmit differential signals to the first timing controller and the second timing controller, wherein the first timing controller comprises:

a spread-spectrum crystal oscillator frequency multiplier unit configured to provide the first timing control clock;

a differential signal receiving unit configured to corresponding one of the differential signals;

a video capture unit electrically connected to the differential signal receiving unit and configured to acquire video data in the corresponding one of the differential signals;

an algorithm unit electrically connected to the video capture unit and configured to process the video data;

a time sequence generating unit electrically connected to the algorithm unit and configured to generate the first timing control clock; and a point-to-point transmission unit configured to embed the first timing control clock in the first timing control signal and transmit the first timing control signal;

wherein constituent units of the second timing controller are the same as constituent units of the first timing controller, and a frequency range of the first timing control clock does not overlap with a frequency range of the second timing control clock.

3. The display device driving control circuit assembly according to claim 2, wherein the spread-spectrum crystal oscillator frequency multiplier unit of the first timing controller is configured to provide the first timing control clock according to a first center frequency f1 and a first spreading ratio value r1, the frequency of the first timing control clock ranges from f1(1−r1) to f1(1+r1), the spread-spectrum crystal oscillator frequency multiplication unit of the second timing controller is configured to provide the second timing control clock according to a second center frequency f2 and a second spread-spectrum ratio value r2, and the frequency of the second timing control clock ranges from f2(1−r2) to f2(1+r2).

4. The display device driving control circuit assembly according to claim 3, wherein the first timing controller is a master timing controller, and the second timing controller is a slave timing controller, and wherein a second center frequency f2 of the second timing control clock of the second timing controller is set according to an offset of the first center frequency f1 of the first timing control clock of the first timing controller, and meets f1>f2 and f1(1−r1)>f2 (1+r2).

5. The display device driving control circuit assembly according to claim 1, wherein a frequency difference (f1−f2)/f1 of the second center frequency f2 of the second timing control clock and the first center frequency f1 of the first timing control clock ranges from 2% to 10%.

6. The display device driving control circuit assembly according to claim 1, wherein the first driving signal is obtained based on the first timing control signal and a number of the first driving control chips, and the second driving signal is obtained based on the second timing control signal and a number of the second driving control chips.

7. A display device, comprising:

a display panel comprising a plurality of pixel units; and a display device driving control circuit assembly connected to the display panel, wherein the display device driving control circuit assembly comprises:

a timing control module comprising a first timing controller and a second timing controller, wherein the first timing controller is configured to transmit a first timing control signal according to a first timing control clock, and the second timing controller is configured to transmit a second timing control signal according to a second timing control clock, and wherein a frequency of the second timing control clock is different from a frequency of the first timing control clock;

a first driving control module comprising a plurality of first driving control chips electrically connected to the first timing controller, wherein each of the first driving control chips is configured to receive the first timing control signal, to generate a first driving signal according to the first timing control signal, and to transmit the first driving signal to a display panel, and wherein the first driving signal is embedded with a first driving control clock; and a second driving control module comprising a plurality of second driving control chips electrically connected to the second timing controller, wherein each of the second driving control chips is configured to receive the second timing control signal, to generate a second driving signal according to the second timing control signal, and to transmit the second driving signal to the display panel, wherein the second driving signal is embedded with a second driving control clock, and wherein a frequency of the second driving control clock is different from a frequency of the first driving control clock;

wherein each of the plurality of first driving control chips comprises: a data recovery device configured to receive and process the first timing control signal, and convert the first timing control signal from a serial signal into a parallel signal to obtain an internal data signal; a digital logic register transmission device electrically connected to the data recovery device and configured to receive and process the internal data signal and generate the first driving control clock; a buffer device electrically connected to the digital logic register transmission device and configured to buffer output and input impedance and provide a stable first driving signal; and a data bus device electrically connected to the buffer device and configured to the stable first driving signal to the display panel, wherein constituent units of each of the plurality of second driving control chips are the same as constituent units of corresponding one of the plurality of first driving control chips, wherein the first timing controller and the first driving control module are configured to drive a part of the plurality of pixel units, and the second timing controller and the second driving control module are configured to drive another part of the plurality of pixel units.

8. The display device according to claim 7, wherein the timing control module further comprises a processor device electrically connected to the first timing controller and the second timing controller configured to transmit differential signals to the first timing controller and the second timing controller, wherein the first timing controller comprises:

a spread-spectrum crystal oscillator frequency multiplier unit configured to provide the first timing control clock;

a differential signal receiving unit configured to corresponding one of the differential signals;

a video capture unit electrically connected to the differential signal receiving unit and configured to acquire video data in the corresponding one of the differential signals;

an algorithm unit electrically connected to the video capture unit and configured to process the video data;

a time sequence generating unit electrically connected to the algorithm unit and configured to generate the first timing control clock; and a point-to-point transmission unit configured to embed the first timing control clock in the first timing control signal and transmit the first timing control signal;

wherein constituent units of the second timing controller are the same as constituent units of the first timing controller, and a frequency range of the first timing control clock does not overlap with a frequency range of the second timing control clock.

9. The display device of claim 8, wherein the spread-spectrum crystal oscillator frequency multiplier unit of the first timing controller is configured to provide the first timing control clock according to a first center frequency f1 and a first spreading ratio value r1, the frequency of the first timing control clock ranges from f1(1−r1) to f1(1+r1), the spread-spectrum crystal oscillator frequency multiplication unit of the second timing controller is configured to provide the second timing control clock according to a second center frequency f2 and a second spread-spectrum ratio value r2, and the frequency of the second timing control clock ranges from f2(1−r2) to f2(1+r2).

10. The display device according to claim 9, wherein the first timing controller is a master timing controller, and the second timing controller is a slave timing controller, and wherein a second center frequency f2 of the second timing control clock of the second timing controller is set according to an offset of the first center frequency f1 of the first timing control clock of the first timing controller, and meets f1>f2, and f1(1−r1)>f2(1+r2).

11. The display device according to claim 7, wherein a frequency difference of the second timing control clock and the first timing control clock ranges from 2% to 10%.

12. The display device according to claim 7, wherein the first driving signal is obtained based on the first timing control signal and a number of the first driving control chips, and the second driving signal is obtained based on the second timing control signal and a number of the second driving control chips.

* * * * *